(12) United States Patent
Wen

(10) Patent No.: US 6,407,739 B1
(45) Date of Patent: Jun. 18, 2002

(54) ARTICLE AND METHOD FOR DISPLAYING A GRAPHICAL HISTORY LIST

(76) Inventor: James C. Wen, 86-47 Clio St., Holliswood, NY (US) 11423

( * ) Notice: Subject to any disclaimer, the term of this patent is extended or adjusted under 35 U.S.C. 154(b) by 0 days.

(21) Appl. No.: 09/283,464

(22) Filed: Apr. 1, 1999

Related U.S. Application Data

(60) Provisional application No. 60/097,040, filed on Aug. 19, 1998.

(51) Int. Cl.[7] .............................. G06T 11/20; G06F 7/00
(52) U.S. Cl. ....................... 345/440; 345/765; 345/826; 345/827; 700/91; 707/1
(58) Field of Search ................................. 345/353, 356, 345/357, 333, 334, 335, 339, 440, 441, 704, 748–749, 721, 723, 734, 764–766, 776, 826–827; 717/5, 8; 707/5, 7, 1, 3, 101, 102, 511, 514; 700/91

(56) References Cited

U.S. PATENT DOCUMENTS

| | | | |
|---|---|---|---|
| 5,317,740 A | 5/1994 | Sites | 395/700 |
| 5,507,030 A | 4/1996 | Sites | 395/800 |
| 5,649,203 A | 7/1997 | Sites | 395/709 |
| 6,035,330 A | 3/2000 | Astiz | 345/356 |
| 6,078,326 A | 6/2000 | Kilmer | 345/356 |

OTHER PUBLICATIONS surf Visualization; James Wen, web page at www.surfserf.com/whitepapers/surfviz.html, 1998.

*Primary Examiner*—Matthew Luu
*Assistant Examiner*—Wesner Sajous

(57) ABSTRACT

A tool is disclosed that assists a user to assimilate, interrelate, and remember a succession of resources that are retrieved by a computer under the direction of the user. In particular, some embodiments of the present invention are ideal for assisting users in browsing the World Wide Web, but are equally well-suited to users who retrieve a variety of tangible and intangible resources (e.g., laboratories samples, inventory, database entries, etc.) with the assistance of a computer.

To this end, the illustrative embodiment of the present invention monitors a succession of resources retrieved by a computer under the direction of a user, records the address of each resource and displays a graph of nodes and edges representing the resources and an indication of the order in which they were retrieved. Furthermore, a salient characteristic of the illustrative embodiment is that it enables the user to personalize the information associated with each node, which assists the user in: (1) remembering what the content of each resource is, and (2) relating resources with similar traits.

20 Claims, 6 Drawing Sheets

ARTICLE AND METHOD FOR DISPLAYING A GRAPHICAL HISTORY LIST

CROSS-REFERENCE TO RELATED APPLICATIONS

This application claims the benefit of U.S. Provision Application Ser. No. 60/097,040, filed Aug. 19, 1998, and entitled "Graphical Means for Visualizing Hypertextual Traversal."

FIELD OF THE INVENTION

The present invention relates to a tool for use with a computer, in general, and, more particularly, to a tool that relates and organizes a succession of resources (e.g., World Wide Web pages, etc.) that are retrieved by a computer.

BACKGROUND OF THE INVENTION

The World Wide Web has recently emerged as an unparalleled source of information and entertainment, and its ease-of-use has spurred many people to routinely use a computer who had never done so before. One of the features of the Web that makes it so powerful and user-friendly is the ubiquity of embedded hyperlinks that enable a Web page to reference another page, and a user to retrieve the referenced page by merely clicking on its reference in the referring page. Therefore, the incorporation of hyperlinks into Web pages enables, and almost compels, a user to successively retrieve one Web page after another and another and another.

Sometimes a user's browsing is purposeful—for example, the user desires to locate a vendor of 18th century porcelain—and sometimes the browsing is aimless. Although aimless browsing may seem odd, the Web is ideally suited for it and many users experience a great deal of joy in finding fascinating and useful resources that they didn't even know existed. This pleasure is akin to that experienced by a shopper at an antique store, rummage sale or flea market who discovers a valuable item that is unrecognized as such.

But whether the browsing is purposeful or aimless, the fact that the content of the Web is created by autonomous entities and without a cohesive, unifying structure causes the process of browsing to be analogous to that of traversing a maze. In browsing the Web, as in traversing a maze, a user commonly explores a series of Web pages until it either yields fruit or appears fruitless, and then backtracks to a familiar page to set out in a new direction. And for the same reason that people get lost and disoriented in a labyrinth, so too users get lost and disoriented in browsing the Web. Although the disorientation in browsing the Web is not strictly spatial, it has two adverse effects on the user.

First, the disorientation hampers the user's sense of which Web pages have and which have not been explored, which degrades the user's ability to browse efficiently. Although the notion of efficiency may only appear important to those users who browse purposefully, even a user who browses aimlessly doesn't want to inadvertently retrieve the same uninteresting Web page two or three or four times any more than a shopper desires to visit the same rummage sale twice in one day. Therefore, the need exists for a mechanism that improves a user's efficiency in browsing the Web.

Second, the disorientation hamper's the users ability to assimilate useful and interesting information garnered from disparate Web pages. As in traditional learning, it is much harder to interrelate and remember facts whose connection is unclear, and much easier to learn them when a framework is presented. Therefore, the need exists for a mechanism that improves a user's ability to assimilate, interrelate, and remember useful and interesting information garnered from the Web.

SUMMARY OF THE INVENTION

The present invention is a tool that assists a user to assimilate, interrelate, and remember a succession of resources that are retrieved by a computer under the direction of the user. In particular, some embodiments of the present invention are ideal for assisting users in browsing the World Wide Web, but are equally well-suited to users who retrieve a variety of tangible and intangible resources (e.g., laboratories samples, inventory, database entries, etc.) with the assistance of a computer.

To this end, the illustrative embodiment of the present invention monitors the retrieval of a succession of resources by a computer under the direction of a user, records the address of each resource and displays a graph of nodes and edges representing the resources and an indication of the order in which they were retrieved. For example, the graph of nodes can assist the user to understand which resources have been explored, which have not, which contain useful leads, which are fruitless, which are interesting, etc. By drawing each retrieved resource as a node in a graph, the illustrative embodiment graphically ties each retrieved resource to its predecessor(s) and successors, which helps the user assimilate, interrelate and remember the resources that were retrieved.

Furthermore, a salient characteristic of the illustrative embodiment is that it enables the user to personalize the information associated with each node, which assists the user in: (1) remembering what the content of each resource is, and (2) relating resources with similar traits. Although the fact that the illustrative embodiment enables a user to personalize the information associated with each node may appear trivial, its subtlety should not be misinterpreted for it is an aspect of the present invention that has a profound effect on effectiveness and that propels a tool that is merely useful into a tool that is nearly indispensable.

The illustrative embodiment of the present invention comprises: recording a first address of a first resource that is retrieved by a computer; receiving a first assigned mnemonic from a user to associate with said first resource; recording a second address of a second resource that is retrieved by said computer; receiving a second assigned mnemonic from said user to associate with said second resource; and displaying on a graphical user interface a graph comprising a first node that exhibits said first assigned mnemonic, a second node that exhibits said second assigned mnemonic and a first edge from said first node to said second node.

DETAILED DESCRIPTION

Figure 1:
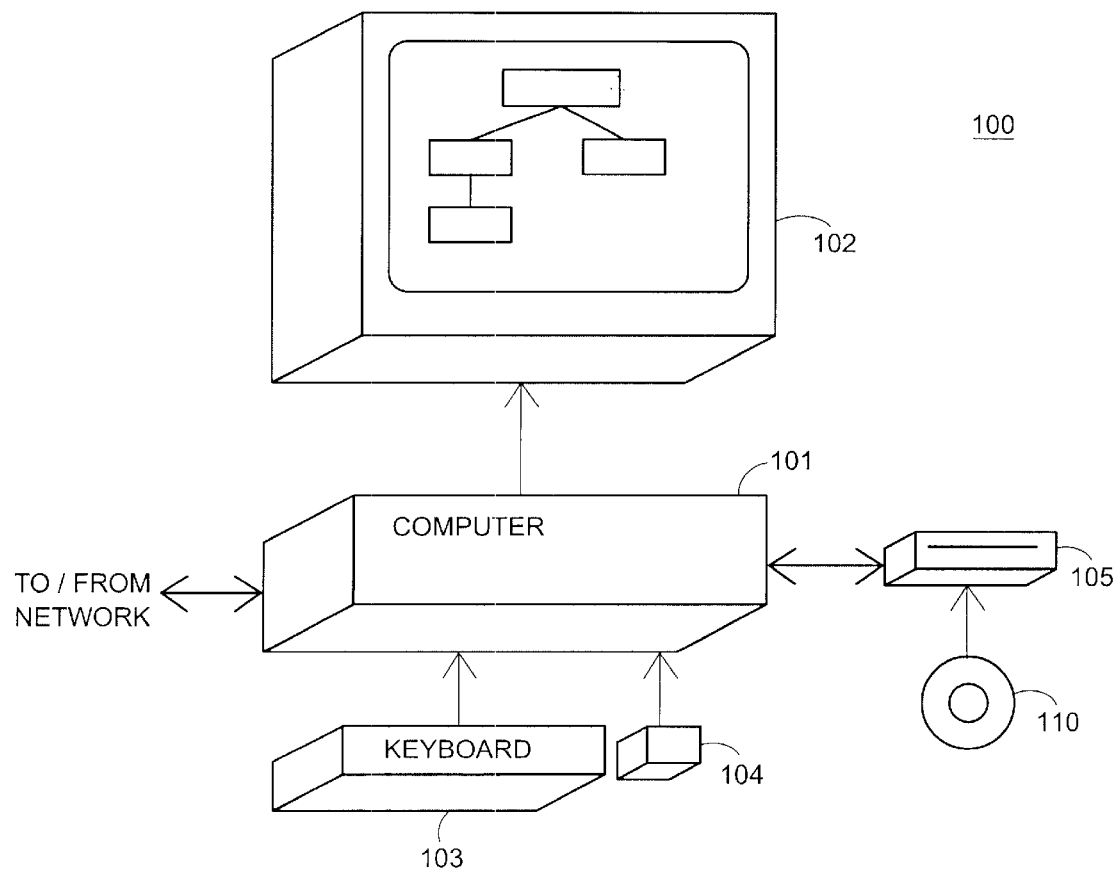
FIG. 1 depicts a drawing of a computer system and a computer-readable storage medium embodying a program in accordance with the illustrative embodiment of the present invention.

FIG. 1 depicts a drawing of computer system 100 and computer-readable storage medium 110, which embodies a program that causes computer system 100 to perform the functionality described below with respect to FIG. 3. Computer system 100 advantageously comprises: computer 101, display 102, keyboard 103, mouse 104 and computer-readable storage medium reader 105. Computer 101, display 102, keyboard 103, mouse 104 and computer-readable storage medium reader 105 are all well-known to those skilled in the art and need not be discussed further. Computer-readable storage medium 110 is a tangible medium (e.g., a CD-ROM, DVD, diskette, disk, tape, etc.) that embodies a computer program and that is readable by computer-readable storage medium reader 105. It will be clear to those skilled in the art how to make and use computer-readable storage medium 110 that embodies a program as described below.

Figure 2:
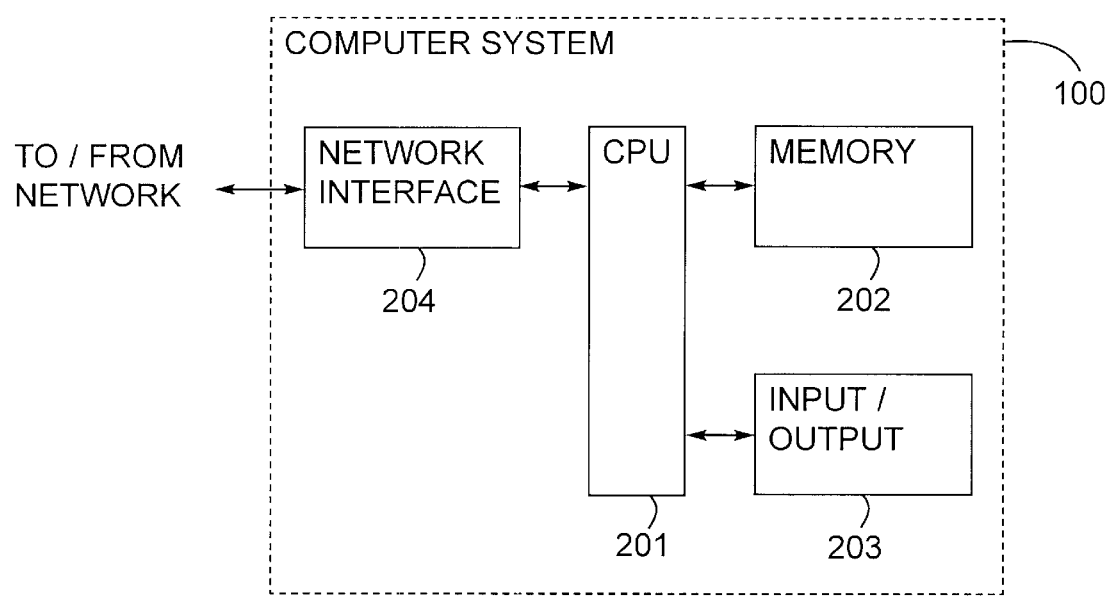
FIG. 2 depicts a functional block diagram of the computer system depicted in FIG. 1.

FIG. 2 depicts a functional block diagram of the computer system depicted in FIG. 1. Computer system 100 advantageously comprises: one or more central processing units 201, memory 202, input/output devices 203 and network interface 204. Input/output devices 203 include, for example, keyboard 103, mouse 104, computer-readable storage medium reader 105, display 102, etc. that are used by a user for inputting information into computer system 100 or for receiving information from computer system 100 or both. Network interface 204 enables computer system 100 to retrieve resources via a network (e.g., the Internet, the World Wide Web, an intranet, a local area network, etc.). Furthermore, computer system 100 is capable of reading a program on computer-readable storage medium 110 and of executing the program so that the program causes computer system 100 to perform the functions in the program. It will be clear to those skilled in the art how to make and use computer system 100.

Figure 3:
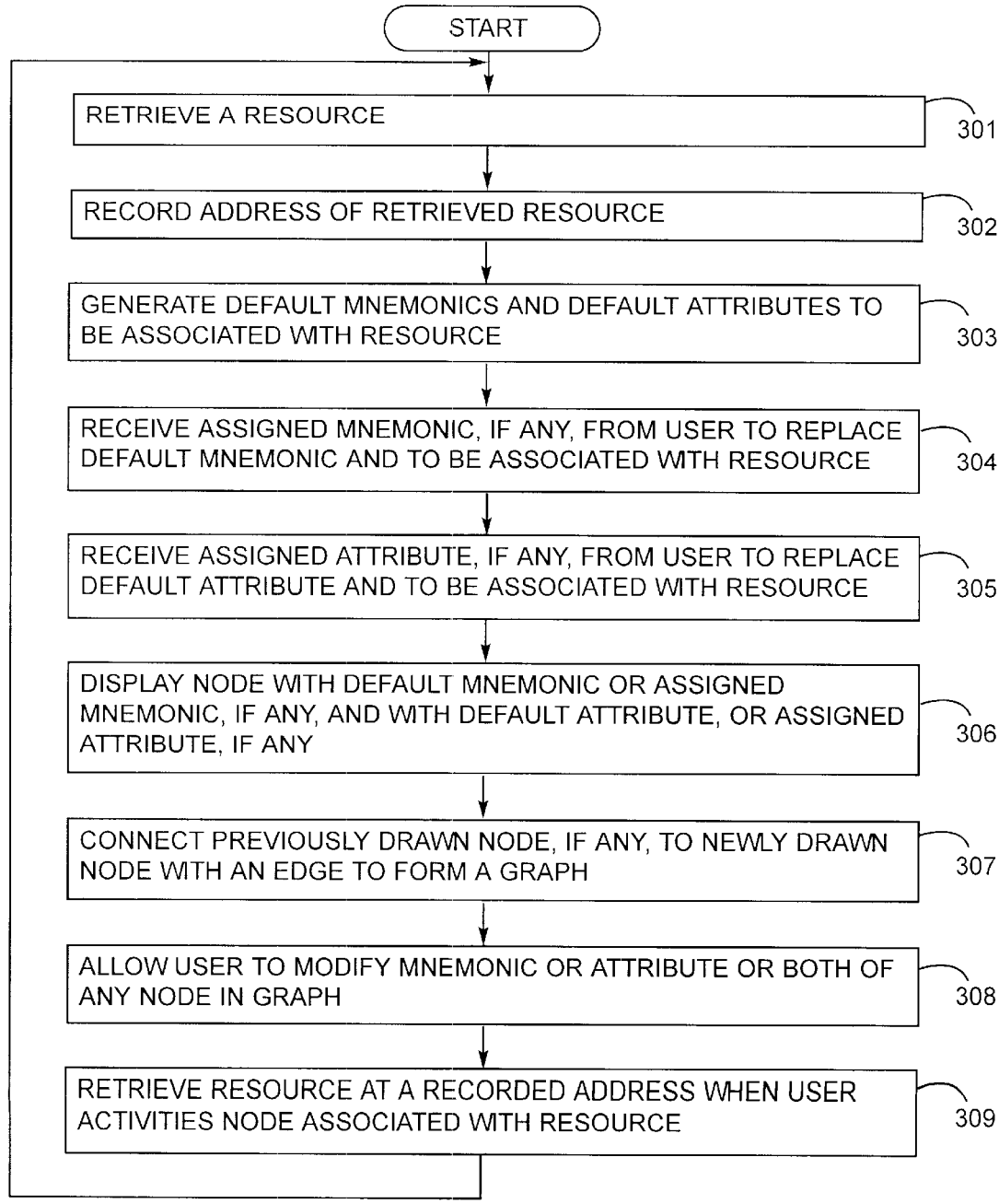
FIG. 3 depicts a flowchart of the operation of the illustrative embodiment of the present invention.

FIG. 3 depicts a flowchart of the operation of the program embodied on computer-readable storage medium 110 that causes computer system 100 to perform the functionality described below.

At step 301, the user causes the computer to retrieve a resource. For the purposes of this specification, a "resource" is defined as one or more files (e.g., a World Wide Web page with ancillary graphics, a Usenet posting, a help file, a corporate personnel file, etc.), a portion of a file (e.g., an entry in a database, etc.) or a physical object (e.g., a biological specimen in a computer-controlled lab, a package of wing-nuts in a robot-controlled warehouse, etc.) or a token for a physical object. Furthermore, the resource can be retrieved from anywhere (e.g., a local mass storage device, a remote mass storage device via an intranet, a remote mass storage device via the Internet, a biology lab, a warehouse, etc.). And still furthermore, successively retrieved resources can be of varied types (i.e., one retrieved resource can be a file while the next is a package of wing-nuts and the next a Usenet posting).

At step 302, the computer records the address of the retrieved resource and associates it with the resource. The address can be any indicium (e.g., a Uniform Resource Locator in the case of a resource retrieved via the Internet or an intranet, or a filename and pathname in the case of a file retrieved locally or over a local area network, an aisle, shelf and bin number in the case of a package of wing nuts, etc.) that uniquely identifies the location of that resource for subsequent retrieval by the computer. It will be clear to those skilled in the art that step 302 can be performed before, after or concurrently with step 301.

Because the illustrative embodiment displays a node in a graph as a symbol for each retrieved resource, and because each node is a visual entity, each node is advantageously depicted with a mnemonic and as exhibiting one or more attributes. Furthermore, because a user may not desire to continually interrupt his or her session of retrieving resources to assign mnemonics and attributes to each node as each resource is retrieved and each node is displayed, at step 303, the computer advantageously generates a default mnemonic and one or more default attributes for each node that are used until the user decides, if ever, to substitute the default mnemonics and attributes with assigned mnemonics or assigned attributes or both.

For the purposes of this specification, a "mnemonic" is defined as a device that assists a user in remembering some aspect of a resource. A mnemonic can include, but is not limited to, text, an image, a sound or any combination of these. For example, if a resource pertains to sparrows, a reasonable mnemonic for the resource could be the text "sparrows" or the text "birds" or an icon of a bird, etc.

For the purposes of this specification, a "default mnemonic" is defined as a mnemonic that is generated by the computer. Advantageously, the computer can generate a default mnemonic in accordance with, for example, a rule or by analysis of the retrieved resource or the address of the retrieved resource or by any combination of these. For example, the default mnemonic of a Web page could be the Uniform Resource Locator of the Web page, the title of the Web page, etc.

Furthermore, because a node and its associated mnemonic are visual entities, each node advantageously exhibits one or more attributes. For the purposes of this specification, an "attribute" is defined as a visual property of a node and its associated mnemonic. The purpose of enabling the attributes of a node to be effected are to enable a user to mark nodes that have some similarity with a common attribute. For example, Table 1 provides a list of the attributes that can be affected by the illustrative embodiment of the present invention.

TABLE 1

Sample Attributes

| Attribute | Description of Attribute |
| --- | --- |
| Node_Shape | The shape of a node can be effected. For example, all nodes relating to birds can be circles, while nodes relating to cars can be square. |
| Node_Color | The color of a node can be effected. For example, all nodes relating to domestic cars are blue, while all nodes relating to foreign cars are red. |
| Node_Background_Color | The color of the region circumscribed by a node can be effected. For example, all nodes relating to Ford cars can have green backgrounds, while all nodes relating to Chrysler cars can have black backgrounds. |
| Node_Mnemonic_Color | The color of the mnemonic circumscribed or associated with a node can be effected. For |

TABLE 1-continued

Sample Attributes

| Attribute | Description of Attribute |
|---|---|
| | example, all nodes relating to Mustangs can have a purple mnemonic, while all nodes relating to Windstars have yellow mnemonics. |
| Node_Size | The relative size of a node can be effected. For example, all nodes visited more recently can be larger than nodes less recently. |
| Node_Blinking | Each node can be varied by a temporal feature, such as blinking. For example, all nodes relating to search engine results blink. |
| Node_Hide | Each node and its associated mnemonics can be hidden, if desired. For example, all nodes relating to Corsairs are hidden. |

Therefore, in accordance with the illustrative embodiment, a node associated with a resource relating Ford Mustang automobiles will be blue squares with green backgrounds and a purple mnemonic. It will be clear to those skilled in the art that there are other attributes of each node and its associated mnemonic that can be affected.

For the purposes of this specification, a "default attribute" is defined as an attribute that is assigned by the computer. Advantageously, the computer can set the default attributes of a node in accordance with, for example, a rule or by analysis of the retrieved resource or the address of the retrieved resource or by any combination of these. For example, the default attributes of a node may be Node_Shape=Rectangle, Node_Color=Blue, Node_Background_Color=Black, Node_Mnemonic_Color=White, Node_Size=1, Node_Blinking=No and Node_Hide=No. It will be clear to those skilled in the art that step 303 can be performed before, after or concurrently with steps 301 and 302.

At step 304, the illustrative embodiment receives an assigned mnemonic from the user, if the user desires, to replace the default mnemonic generated in step 303 and associates the assigned mnemonic with the resource and node. For the purposes of this specification, an "assigned mnemonic" is defined as a mnemonic that is provided by the user. In accordance with the illustrative embodiment of the present invention, the assigned mnemonic can be, but is not limited to, text, an image, a sound or any combination of these.

At step 305, the illustrative embodiment receives one or more assigned attributes from the user, if the user desires, to replace one or more of the default attributes generated in step 303 and associates the assigned attribute or attributes with the resource and node. For the purpose of this specification, an "assigned attribute" is defined as a mnemonic that is provided by the user. It will be clear to those skilled in the art that step 305 can be performed before, after or concurrently with step 304.

At step 306, the illustrative embodiment displays on a graphical user interface a node with the default mnemonic generated in step 303 or the assigned mnemonic received in step 304, if any, and with the default attributes generated in step 304 or the assigned attributes received in step 305, if any. In accordance with the illustrative embodiment, there may be an exception to this rule; if a resource is retrieved more than once, a node is advantageously drawn for that resource only the first time it is retrieved.

At step 307, if a new node is drawn in step 306, the illustrative embodiment connects the previously drawn node, if any, to the newly drawn node with an edge to form a graph. When the previously retrieved reference contains a hyperlink to the most recently retrieved reference, the drawn edge represents the hyperlink from the previously retrieved reference to the most recently retrieved reference. It will be clear to those skilled in the art that step 307 can be performed before, after or concurrently with step 306. In some embodiments of the present invention, an edge is not drawn from a new node to a previously drawn node even if the previously drawn node is revisited after the new node—this ensures that the drawn graph is a tree. In other embodiments of the present invention, however, an edge can be drawn from a new node to a previously drawn node even if the previously drawn node is revisited after the new node. Advantageously, the user can choose whether the user desires that the graph be limited to a tree or not, depending of the preference of the user.

At step 308, the illustrative embodiment enables a user to modify a default or assigned mnemonic or a default or assigned attribute or both for any node in the graph. This is advantageous because only after a user has retrieved four resources pertaining to automobiles may the user decide to assign mnemonics to the nodes associated with those resources. It will be clear to those skilled in the art that step 308 can be performed before, after or concurrently with steps 301–309.

At step 309, the illustrative embodiment retrieves a resource at the associated address when the user activates the node associated with that resource. For example, when the graph is displayed on a graphical user interface, the computer might retrieve the resource associated with a node when the user double-clicks with his or her mouse on the node. It will be clear to those skilled in the art that step 308 can be performed before, after or concurrently with steps 301–309. After step 309, control returns to step 301.

By viewing the drawn graph and default mnemonics, and by modifying the default mnemonics and attributes, a device is created that assists a user in assimilating, interrelating and remembering the succession of resources that are retrieved by the computer.

For pedagogical purposes, FIGS. 4–8 depict successive views of an illustrative graph as an illustrative succession of resources is retrieved and an illustrative user assigns mnemonics and attributes to the nodes in the graph in accordance with the method described above. In the illustrative example, a user desires to get information pertaining to Ford minivans on the Web and the first resource retrieved is the Web page for Ford Motor Company at www.ford.com. Furthermore, the default mnemonic for each resource is the filename of the Web page (without the file extension), the domain name for the default Web page (index.htm) of a domain, and the default attributes are: Node_Shape=Rectangle, Node_Color=Blue, Node_Background_Color=White, Node_Mnemonic_Color=Black, Node_Size=1, Node_Blinking=No and Node_Hide=No.

Figure 4:
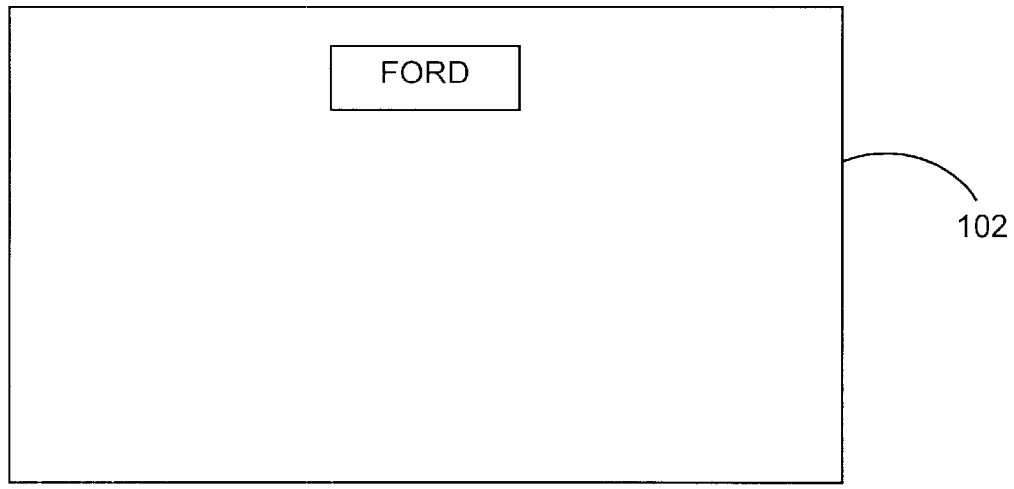
FIG. 4 depicts a first illustrative graph in accordance with the illustrative embodiment of the present invention.
Figure 5:
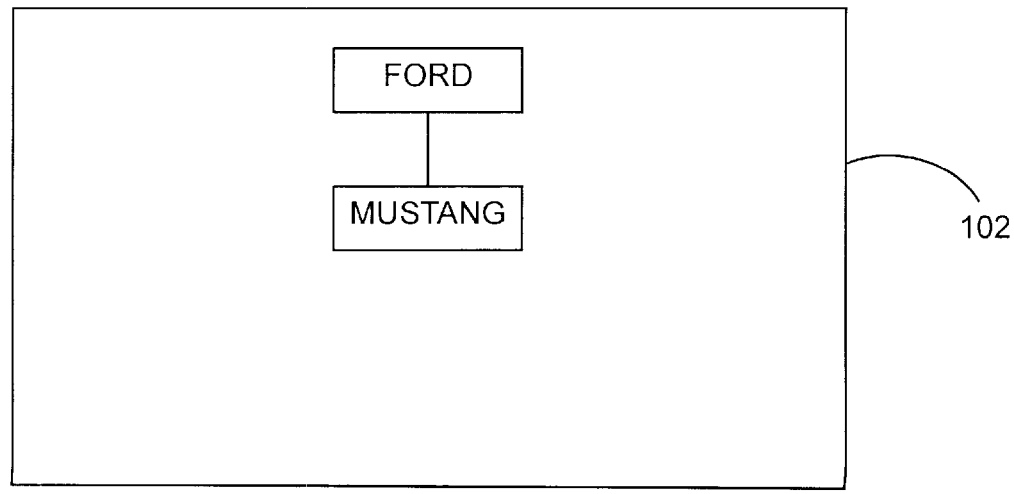
FIG. 5 depicts a second illustrative graph in accordance with the illustrative embodiment of the present invention.

Therefore, the illustrative embodiment records the address of www.ford.com/index.htm, assigns the default mnemonic "ford," and, as shown in FIG. 4, displays a node circumscribing the default mnemonic and exhibiting the default attributes.

Because the resource "www.ford.com" contains a hyperlink to "Ford Mustang" with the address "www.ford.com/mustang.htm" and the user has subsequently retrieved that resource, the illustrative embodiment records the address of www.ford.com/mustang.htm, assigns the default mnemonic "mustang," displays a node circumscribing the default mnemonic and exhibiting the default attributes, and draws an edge from the newly drawn node to the previously drawn node.

Figure 6:
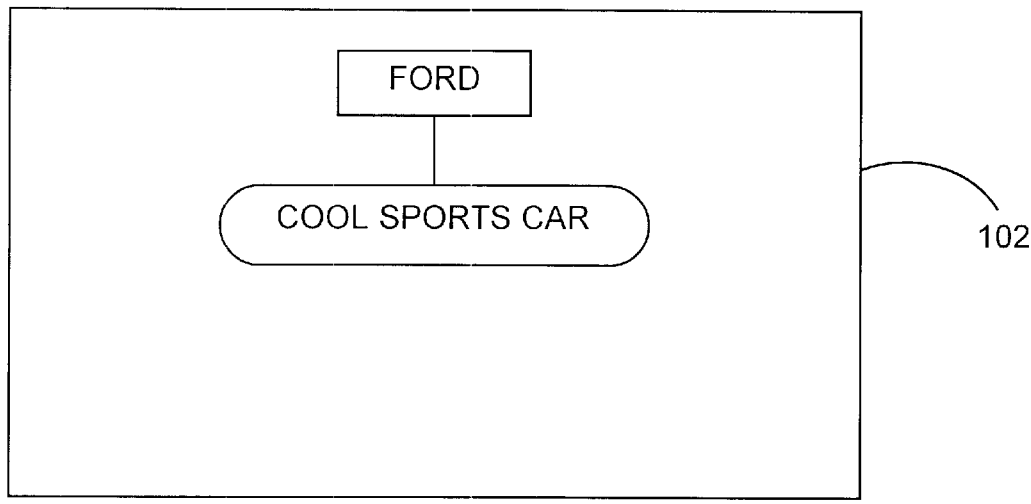
FIG. 6 depicts a third illustrative graph in accordance with the illustrative embodiment of the present invention.

In the illustrative example, the user reads the Web page at www.ford.com/mustang and learns that this relates to sports cars and not minivans. Therefore, although the user may consider this page interesting and noteworthy for a future occasion, it is not relevant to the issue at hand. But before returning to the Ford home page, the user can change the default mnemonic "Mustang" to something more memorable, to something that will help the user remember that here is a resource devoted to sports cars. To this end, the user can modify the default mnemonic and enter an assigned mnemonic, such as "Cool Sports Cars." Furthermore, the user can modify the default attribute Node_Shape to Node_Shape=Oval as a further reminder that this was a noteworthy resource. Other attributes could be changed as well. FIG. 6 depicts the graph after the assigned mnemonic and assigned attributes have been made.

Figure 7:
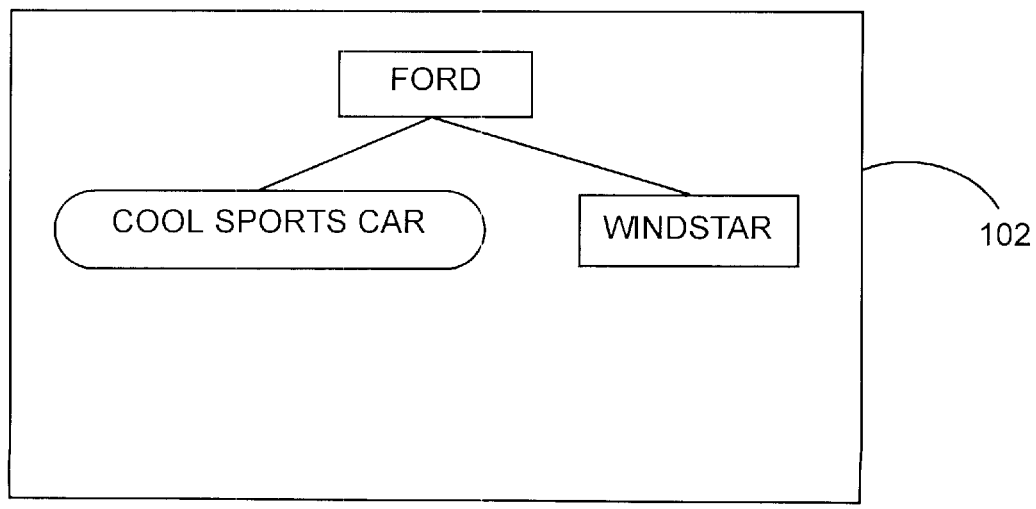
FIG. 7 depicts a fourth illustrative graph in accordance with the illustrative embodiment of the present invention.
Figure 8:
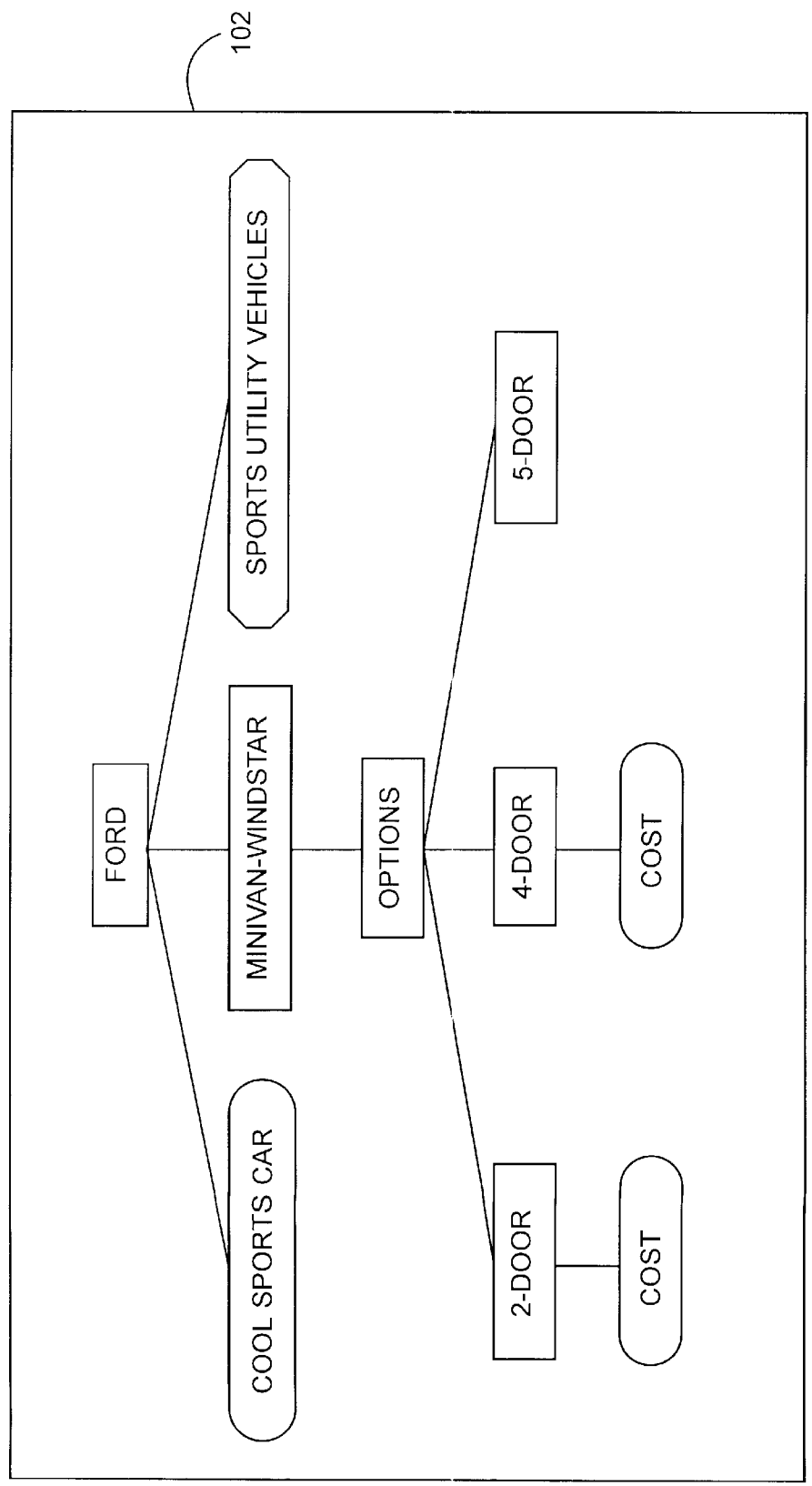
FIG. 8 depicts a fifth illustrative graph in accordance with the illustrative embodiment of the present invention.

As is typical of a user who desires to explore alternative avenues, the user backtracks to the Ford home page. This backtracking advantageously does not change the appearance of the graph. Because the resource "www.ford.com" contains another hyperlink to "Ford Windstar" with the address "www.ford.com/windstar.htm" and the user retrieves that resource, the illustrative embodiment records the address of www.ford.com/windstar.htm, assigns the default mnemonic "windstar," displays a node circumscribing the default mnemonic and exhibiting the default attributes, and draws an edge from the newly drawn node to the previous node. This is depicted in FIG. 7. Note further that the drawn graph is advantageously "balanced" so as to suggest the relationship of the three retrieved resources. In particular, that the "Mustang" and "Windstar" Web pages are descended from and related to the Ford home page. The user can subsequently visit more pages, modify default mnemonics and attributes so that a graph such as that depicted in FIG. 8 is drawn.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A computer-readable storage medium embodying a program, said program comprising:
   means for causing said computer to record a first address of a first resource that is retrieved by said computer;
   means for causing said computer to record a second address of a second resource that is retrieved by said computer;
   means for causing said computer to receive a first assigned mnemonic from a user and to associate said first assigned mnemonic with said first resource;
   means for causing said computer to receive a second assigned mnemonic from said user and to associate said second assigned mnemonic with said second resource; and
   means for causing said computer to display a graph comprising:
   (i) a first node exhibiting said first assigned mnemonic,
   (ii) a second node exhibiting said second assigned mnemonic, and
   (iii) a first edge from said first node to said second node.

2. The computer-readable storage medium of claim 1 wherein said first resource comprises a hyperlink to said second resource and said first edge represents said hyperlink.

3. The computer-readable storage medium of claim 1 further comprising:
   means for causing said computer to receive a first assigned attribute from said user; and means for causing said first node to be displayed to exhibit said first assigned attribute.

4. The computer-readable storage medium of claim 3 wherein said first assigned attribute affects the displayed color of said first node.

5. The computer-readable storage medium of claim 3 further comprising means for enabling said user to substitute said first assigned mnemonic with a first modified mnemonic.

6. The computer-readable storage medium of claim 1 further comprising means for causing said computer to retrieve said first resource using said first address when said user activates said first node.

7. The computer-readable storage medium of claim 1 wherein said first assigned mnemonic comprises text.

8. The computer-readable storage medium of claim 1 further comprising:
   means for causing said computer to record a third address of a third resource that is retrieved by said computer;
   means for causing said computer to receive a third assigned mnemonic from said user and to associate said third assigned mnemonic with said third resource; and
   means for causing said computer to display a graph comprising:
   (i) a first node exhibiting said first assigned mnemonic,
   (ii) a second node exhibiting said second assigned mnemonic,
   (iii) a third node exhibiting said third assigned mnemonic,
   (iv) a first edge from said first node to said second node, and
   (v) a second edge from said first node to said second node.

9. A method comprising:
   recording a first address of a first resource that is retrieved by a computer;
   receiving a first assigned mnemonic from a user to associate with said first resource;
   recording a second address of a second resource that is retrieved by said computer;
   receiving a second assigned mnemonic from said user to associate with said second resource; and
   displaying on a graphical user interface a graph comprising a first node that exhibits said first assigned mnemonic, a second node that exhibits said second assigned mnemonic and a first edge from said first node to said second node.

10. The method of claim 9 wherein said first resource comprises a hyperlink to said second resource and said first edge represents said hyperlink.

11. The method of claim 9 further comprising:
    receiving a first assigned attribute from said user to apply to said first node; and
    displaying said first node on said graphical user interface in accordance with said first assigned attribute.

12. The method of claim 11 wherein said first assigned attribute affects the color of said first node.

13. The method of claim 9 further comprising:
    receiving a command from said user to substitute said first assigned mnemonic with a first modified mnemonic; and displaying said first node with said first modified mnemonic.

14. The method of claim 9 further comprising retrieving said first resource at said first address when said user activates said first node on said graphical user interface.

15. The method of claim 9 wherein said first assigned mnemonic comprises text and said second assigned mnemonic comprises text.

16. A method comprising:

recording a first address of a first resource that is retrieved by a computer;

recording a second address of a second resource that is retrieved by said computer;

displaying on a graphical user interface a graph comprising a first node that exhibits a first default mnemonic, a second node that exhibits a second default mnemonic and a first edge from said first node to said second node;

receiving a first assigned mnemonic from said user to associate with said first resource; and redrawing said graph on said graphical user interface so that said first node exhibits said first assigned mnemonic, said second node exhibits said second default mnemonic and said first edge from said first node to said second node.

17. The method of claim 16 wherein said first resource comprises a hyperlink to said second resource and said first edge represnts said hyperlink.

18. The method of claim 16 further comprising:

receiving a first assigned attribute from said user to apply to said first node; and displaying said first node on said graphical user interface in accordance with said first assigned attribute.

19. The method of claim 18 wherein said first attribute affects the displayed color of said first node.

20. The method of claim 16 further comprising:

receiving a modified mnemonic from said user to associate with said first resource; and redrawing said graph on said graphical user interface so that said first node exhibits said first modified mnemonic, said second node exhibits said second default mnemonic and said first edge from said first node to said second node.

* * * * *